United States Patent
Sivagnanenthirarajah et al.

(10) Patent No.: US 12,086,613 B2
(45) Date of Patent: Sep. 10, 2024

(54) SENSOR BROKER FOR PLUG-INS

(71) Applicant: Microsoft Technology Licensing, LLC, Redmond, WA (US)

(72) Inventors: Ugan Sivagnanenthirarajah, Seattle, WA (US); Michael Jeffrey Ajax, Redmond, WA (US); Sathyanarayanan Karivaradaswamy, Sammamish, WA (US); Robert Eugene Harris, Jr., Woodinville, WA (US); Sanjana Ramakrishnan Sunder, Redmond, WA (US); Sanjeev Chandra Reddy, Redmond, WA (US); Sergii Viktorovych Liashenko, Edmonds, WA (US)

( * ) Notice: Subject to any disclaimer, the term of this patent is extended or adjusted under 35 U.S.C. 154(b) by 0 days.

(21) Appl. No.: 18/326,734

(22) Filed: May 31, 2023

(65) Prior Publication Data
US 2024/0256295 A1    Aug. 1, 2024

Related U.S. Application Data

(60) Provisional application No. 63/482,501, filed on Jan. 31, 2023.

(51) Int. Cl.
G06F 9/445    (2018.01)
G06F 9/4401   (2018.01)

(52) U.S. Cl.
CPC ........ *G06F 9/44526* (2013.01); *G06F 9/4401* (2013.01)

(58) Field of Classification Search
CPC ............................ G06F 9/44526; G06F 9/4401
See application file for complete search history.

(56) References Cited

U.S. PATENT DOCUMENTS

| | | |
|---|---|---|
| 10,819,920 B1 | 10/2020 | Hamlin |
| 2006/0192775 A1 | 8/2006 | Nicholson et al. |
| 2012/0173682 A1* | 7/2012 | Mantere .............. G06F 9/44505 709/221 |
| 2012/0233272 A1 | 9/2012 | Bedi |

(Continued)

FOREIGN PATENT DOCUMENTS

CN    102306047 A    1/2012

(Continued)

OTHER PUBLICATIONS

International Search Report and Written Opinion received for PCT Application No. PCT/US2024/010382, Apr. 4, 2024, 14 pages.

(Continued)

*Primary Examiner* — Brian Whipple
(74) *Attorney, Agent, or Firm* — Workman Nydegger

(57) ABSTRACT

A device receives a sensor payload at a sensor service. The sensor payload includes a data field that comprises a first value that corresponds to a reading by a sensor device. The device sends the sensor payload to a broker process that is separate from the sensor service and that hosts plug-in logic. The device receives a sensor payload update from the broker process. The sensor payload update includes a second value for the data field that is different from the first value. The second value was determined by the plug-in logic. The device creates a modified sensor payload from the sensor payload, including updating the data field to comprise the second value. The device initiates an operating system action based on the modified sensor payload.

20 Claims, 6 Drawing Sheets

(56) References Cited

U.S. PATENT DOCUMENTS

| | | | |
|---|---|---|---|
| 2014/0156228 A1 | 6/2014 | Molettiere et al. | |
| 2017/0132794 A1 | 5/2017 | Lee | |
| 2017/0193282 A1 | 7/2017 | Valko et al. | |
| 2020/0012331 A1 | 1/2020 | De Cesare et al. | |
| 2020/0026342 A1 | 1/2020 | Sengupta | |
| 2020/0133374 A1 | 4/2020 | Sinha et al. | |
| 2022/0075929 A1* | 3/2022 | Booth | G06F 40/284 |
| 2022/0319300 A1* | 10/2022 | Stewart | G08B 27/005 |
| 2023/0335287 A1* | 10/2023 | Miller | G16H 20/00 705/2 |

OTHER PUBLICATIONS

Invitation to Pay Additional Fees received for PCT Application No. PCT/US2024/010383, Apr. 4, 2024, 15 pages.

"CreateRestrictedToken function (securitybaseapi.h)", Retrieved From: https://learn.microsoft.com/en-us/windows/win32/api/securitybaseapi/nf-securitybaseapi-createrestrictedtoken, Oct. 13, 2021, 6 Pages.

"DuplicateTokenEx function (securitybaseapi.h)", Retrieved From: https://learn.microsoft.com/en-us/windows/win32/api/securitybaseapi/nf-securitybaseapi-duplicatetokenex, Oct. 13, 2021, 4 Pages.

"HID Sensors Usages", In Whitepaper of Microsoft, Oct. 22, 2015, 163 Pages.

"Microsoft Privacy Statement", Retrieved From: https://privacy.microsoft.com/en-us/privacystatement, Feb. 2023, 9 Pages.

"PoRegisterPowerSettingCallback function (ntifs.h)", Retrieved From: https://learn.microsoft.com/en-us/windows-hardware/drivers/ddi/ntifs/nf-ntifs-poregisterpowersettingcallback, Oct. 22, 2021, 5 Pages.

"Send feedback to Microsoft with the Feedback Hub App", Retrieved From: https://support.microsoft.com/en-us/windows/send-feedback-to-microsoft-with-the-feedback-hub-app-f59187f8-8739-22d6-ba93-f66612949332, Retrieved On: Nov. 18, 2022, 9 Pages.

"SetTokenInformation function (securitybaseapi.h)", Retrieved From: https://learn.microsoft.com/en-us/windows/win32/api/securitybaseapi/nf-securitybaseapi-settokeninformation, Oct. 13, 2021, 3 Pages.

Abzarian, et al., "HID Usage Tables for Universal Serial Bus (USB)", Retrieved From: https://www.usb.org/sites/default/files/hut1_21_0.pdf, Oct. 12, 2020, 319 Pages.

Berrendonner, et al., "Busiotools", Retrieved From: https://github.com/microsoft/busiotools/blob/master/sensors/tracing/README.md, Jan. 13, 2023, 2 Pages.

Golden, et al., "Camera Privacy Shutters and Kill Switches", Retrieved From: https://learn.microsoft.com/en-us/windows-hardware/drivers/stream/camera-privacy-controls, Jan. 20, 2023, 16 Pages.

Golden, et al., "Privacy Shutter/Switch Notification", Retrieved From: https://learn.microsoft.com/en-us/windows-hardware/drivers/stream/privacy-shutter-notification, Jun. 30, 2022, 6 Pages.

Graff, et al., "Windows Hardware Compatibility Program", Retrieved From: https://learn.microsoft.com/en-us/windows-hardware/design/compatibility/, Jun. 25, 2021, 1 Page.

Hopkins, et al., "Introduction to the Sensor and Location Platform in Windows", Retrieved From: https://learn.microsoft.com/en-us/windows-hardware/drivers/sensors/, Jan. 20, 2022, 4 Pages.

Hopkins, et al., "Proximity Sensor Data Fields", Retrieved From: https://learn.microsoft.com/en-us/windows-hardware/drivers/sensors/proximity-sensor-data-fields?redirectedfrom=MSDN, Mar. 3, 2023, 2 Pages.

Hudek, et al., "Manufacturing Windows Engineering Guide (WEG)", Retrieved From: https://learn.microsoft.com/en-us/windows-hardware/manufacture/desktop/manufacturing-windows-engineering-guide?view=windows-11, Feb. 17, 2023, 23 Pages.

Northrup, et al., "Display Settings Overview", Retrieved From: https://learn.microsoft.com/en-us/windows-hardware/customize/power-settings/display-settings, Apr. 21, 2020, 2 Pages.

Smith, et al., "Dim Display Brightness", Retrieved From: https://learn.microsoft.com/en-us/windows-hardware/customize/power-settings/display-settings-dim-display-brightness, Apr. 11, 2020, 1 Page.

Smith, et al., "Sensors Power Management", Retrieved From: https://learn.microsoft.com/en-us/windows-hardware/design/device-experiences/sensors-power-management-for-modern-standby-platforms, May 3, 2021, 16 Pages.

Viviano, et al., "Hardware Support App (HSA): Steps for App Developers", Retrieved From: https://learn.microsoft.com/en-us/windows-hardware/drivers/devapps/hardware-support-app-hsa--steps-for-app-developers, Dec. 15, 2021, 6 Pages.

Wojciakowski, et al., "Sensors", Retrieved From: https://learn.microsoft.com/en-us/windows/uwp/devices-sensors/sensors, Oct. 21, 2022, 9 Pages.

Hudek, et al., "Unattended Windows Setup Reference", Retrieved From: https://learn.microsoft.com/en-us/windows-hardware/customize/desktop/unattend/, Jun. 25, 2021, 2 Pages.

"Manage App Permissions for your Camera in Windows", Retrieved From: https://support.microsoft.com/en-us/windows/manage-app-permissions-for-your-camera-in-windows-87ebc757-1f87-7bbf-84b5-0686afb6ca6b, Retrieved On: Nov. 18, 2022, 3 Pages.

"Windows Camera, Microphone, and Privacy", Retrieved From: https://support.microsoft.com/en-us/windows/windows-camera-microphone-and-privacy-a83257bc-e990-d54a-d212-b5e41beba857, Retrieved On: Nov. 18, 2022, 8 Pages.

U.S. Appl. No. 63/482,501, filed Jan. 31, 2023.

U.S. Appl. No. 18/327,719, filed Jun. 1, 2023.

International Search Report and Written Opinion received for PCT Application No. PCT/US2024/010383, May 28, 2024, 22 pages.

* cited by examiner

SENSOR BROKER FOR PLUG-INS

CROSS-REFERENCE TO RELATED APPLICATIONS

This application claims priority to, and the benefit of, U.S. Provisional Patent Application Ser. No. 63/482,501, filed Jan. 31, 2023, and entitled "PRESENCE SENSOR EXTENSIONS," the entire contents of which are incorporated by reference herein in their entirety.

BACKGROUND

Computer systems often react to data signals obtained from sensor devices. For example, a human presence sensor, referred to as a "presence sensor" herein, is any hardware that can detect one or more human's distance from a computing device or that can detect indications that one or more humans intend to interact with the computing device. When a presence sensor is available to a computing device, that computing device can react to human presence in a variety of ways, such as by turning the device's screen off automatically when a user is detected as leaving, by waking the device when a user is detected as approaching, etc. Computer systems can interact with, and react to, a wide variety of other types of sensor devices, such as light sensors (e.g., camera, photodiode), sound sensors (e.g., microphone), acceleration sensors (e.g., accelerometer), device orientation sensors (e.g., gyroscope), velocity sensors, magnetic field sensors (e.g., compass), and the like.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including receiving a sensor payload at a sensor service, the sensor payload including a data field that includes a first value that corresponds to a reading by a sensor device; sending the sensor payload to a broker process that is separate from the sensor service and that hosts plug-in logic; receiving a sensor payload update from the broker process, the sensor payload update including a second value for the data field that is different from the first value, the second value having been determined by the plug-in logic; creating a modified sensor payload from the sensor payload, including updating the data field to include the second value; and initiating an operating system action based on the modified sensor payload.

In some aspects, the techniques described herein relate to methods, systems, and computer program products, including receiving a sensor payload at a sensor service, the sensor payload including a data field that includes a first value that is based on a reading by a sensor device and custom payload data; sending the sensor payload to a broker process that is separate from the sensor service and that hosts plug-in logic; receiving a sensor payload update from the broker process, the sensor payload update including a second value for the data field that is different from the first value, the second value having been determined by the plug-in logic based on the custom payload data; creating a modified sensor payload from the sensor payload, including updating the data field to include the second value; and transmitting an instruction to perform an operating system action based on the modified sensor payload.

In some aspects, the techniques described herein relate to methods, systems, and computer program products, including receiving a sensor payload at a sensor service, the sensor payload including a human presence report including a data field that includes a first value that corresponds to a reading by a human presence sensor device; sending the sensor payload to a broker process that is separate from the sensor service and that hosts plug-in logic; receiving a sensor payload update from the broker process, the sensor payload update including a second value for the data field that is different from the first value, the second value having been determined by the plug-in logic; creating a modified sensor payload from the sensor payload, including updating the data field to include the second value; and initiating an operating system action based on the modified sensor payload.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIG. 5 illustrates an example plug-in architecture that facilitates secure communications between a sensor service and a plug-in.

DETAILED DESCRIPTION

Conventionally, operating system (OS) support for sensor devices, such as presence sensors, was limited. This led to a patchwork of hardware and software solutions from various independent hardware vendors (IHVs) and original equipment manufacturers (OEMs) to integrate sensors into their devices. This, in turn, resulted in a lack of uniformity in how sensors were utilized and how related functionality was configured, leading to inconsistency in implementation and interoperability. The embodiments herein are directed to native OS support for sensors, such as presence sensors, as well as mechanisms for sensors to intervene in OS actions and decisions.

Current native OS support for sensors enables sensors to report standardized payloads (e.g., a defined set of data fields) to the OS. For example, a presence sensor reports to an OS a standardized payload comprising a time, a presence state (e.g., whether a human is present), an engagement state (e.g., whether a human's attention is detected), and a distance (e.g., a measured distance of a human from the sensor), with the OS taking defined actions based on the information in that payload. The use of standardized payloads provides predictability and compatibility, but it means that if a sensor is capable of gathering additional information that would be useful to the OS, this information cannot be included in the sensor's payload or utilized by the OS. Thus, there currently is no way for an OS to leverage such information to modify its action(s).

Embodiments of the native OS support for sensors described herein add a new sensor extension and plug-in mechanism, which enables action (e.g., by a third party) on custom sensor payload data via a broker process. These embodiments, therefore, provide a new way for presence sensors and other sensor types to intervene in an OS's actions and decisions based on custom sensor data and custom actions on that data.

Figure 1:
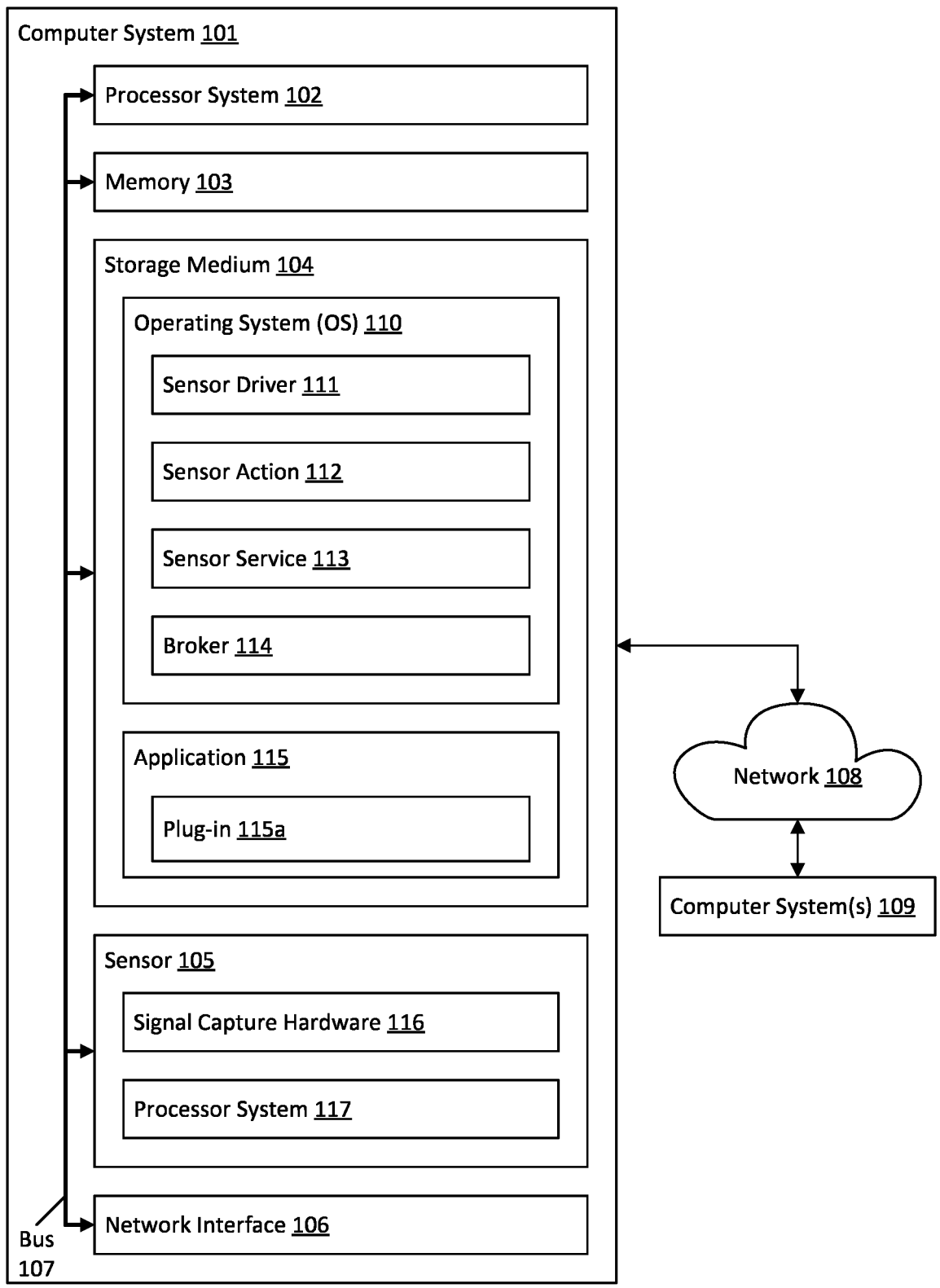
FIG. 1 illustrates an example of a computer architecture that facilitates native support for sensors by an operating system (OS), including a sensor extension and plug-in mechanism that enables custom actions on custom sensor payload data.

FIG. 1 illustrates an example of a computer architecture 100 that demonstrates native support for sensors by an OS, including a sensor extension and plug-in mechanism that enables custom actions on custom sensor payload data. As shown, computer architecture 100 includes a computer system 101 comprising a processor system 102 (e.g., one or more central processing units (CPUs), one or more graphics processing units (GPUs), one or more neural processing units (NPUs)), memory 103 (e.g., system or main memory), a storage medium 104 (e.g., one or more computer-readable storage media), and a sensor 105 (or a plurality of sensors), all interconnected by a bus 107. As shown, computer system 101 may also include a network interface 106 (e.g., one or more network interface cards) for interconnecting (via a network 108) to computer system(s) 109 (e.g., a single computer system or a plurality of computer systems).

In embodiments, sensor 105 comprises signal capture hardware 116 that captures data signal(s) relating to objects external to computer system 101. As examples, signal capture hardware 116 may include a photodiode (luminosity signals), a camera (visual signals), a microphone (audio signals), a radio such as BLUETOOTH or WI-FI (radio signals), an accelerometer (inertial signals), a gyroscope (special orientation signals), a compass (magnetic field signals), and the like.

In some embodiments, sensor 105 also comprises a processor system 117 that processes a data signal captured by signal capture hardware 116 to produce an analysis of the data signal. In embodiments, sensor 105 is a human presence sensor. In these embodiments, processor system 117 processes a data signal captured by signal capture hardware 116 to produce a determination of a human presence state (e.g., present, not present, attentive, non-attentive, arriving, leaving). In these embodiments, an output of sensor 105 is a determined human presence state (e.g., present or not, engaged or not). Examples of processor system 117 include a CPU, a GPU, an NPU, a microcontroller unit (MCU), and a field-programmable gate array (FPGA).

In other embodiments, processor system 102 processes a data signal captured by signal capture hardware 116. For example, when sensor 105 is a human presence sensor, processor system 102 analyzes a data signal captured by signal capture hardware 116 to determine a human presence state (e.g., present, not present, arriving, leaving, attentive, non-attentive). In these embodiments, an output of sensor 105 is raw data signals (e.g., visual signals, audio signals, radio signals). In embodiments, sensor 105 operates according to a human interface device (HID) application programming interface (API).

Depending on the sophistication of signal capture hardware 116 and processor system 117 (or the sensor's use of processor system 102), sensors can produce a wide variety of actionable data. Taking presence sensors as an example, presence sensors are grouped into general categories based on their capabilities. In embodiments, the presence sensor is category one presence sensor. A "category one" presence sensor implements facial presence detection, which includes scanning to detect a face and providing a bounding box around the face (e.g., a bounding box within a video frame). In some embodiments, facial presence detection detects faces only, without distinguishing one face from another face or predicting or classifying facial attributes. In embodiments, the presence sensor is category two presence sensor. A "category two" presence sensor implements people identification and/or people tracking, which detects and tracks individual movements that identify the presence of one or more humans. In embodiments, the presence sensor is a multi-person detection sensor, which enables privacy alerting when multiple humans are detected. In embodiments, the presence sensor is an attention awareness sensor, which enables the detection of a user's intent or attention (e.g., by tracking a user's gaze).

Storage medium 104 is illustrated as storing computer-executable instructions implementing an OS 110 that includes native support for sensors, such as presence sensors. As shown in computer architecture 100, OS 110 includes a sensor driver 111. In some embodiments, such as when sensor 105 is a presence sensor, sensor driver 111 is an HID sensor class driver. In some embodiments, sensor driver 111 obtains raw data signals from sensor 105 and orchestrates the processing of that information at processor system 102. In other embodiments, sensor driver 111 obtains an analysis that is produced by processor system 117, based on processor system 117 having processed raw data signals. Regardless of how sensor driver 111 obtains an analysis of sensor data signals, in embodiments, sensor driver 111 generates a sensor payload for consumption by OS 110. In some embodiments, sensor driver 111 is a part of OS 110 (e.g., distributed with OS 110 or supplied by a vendor of OS 110). In other embodiments, sensor driver 111 is provided by a third party, such as a vendor of application 115, which is discussed in more detail infra. In some embodiments, sensor driver 111 is part of application 115.

As shown in FIG. 1, OS 110 includes a sensor action component 112 and a sensor service 113. In embodiments, sensor service 113 processes payloads obtained from sensor driver 111. In embodiments, sensor action component 112 takes one or more actions based on determinations made by the processing of these sensor payloads by sensor service 113.

Figure 2:
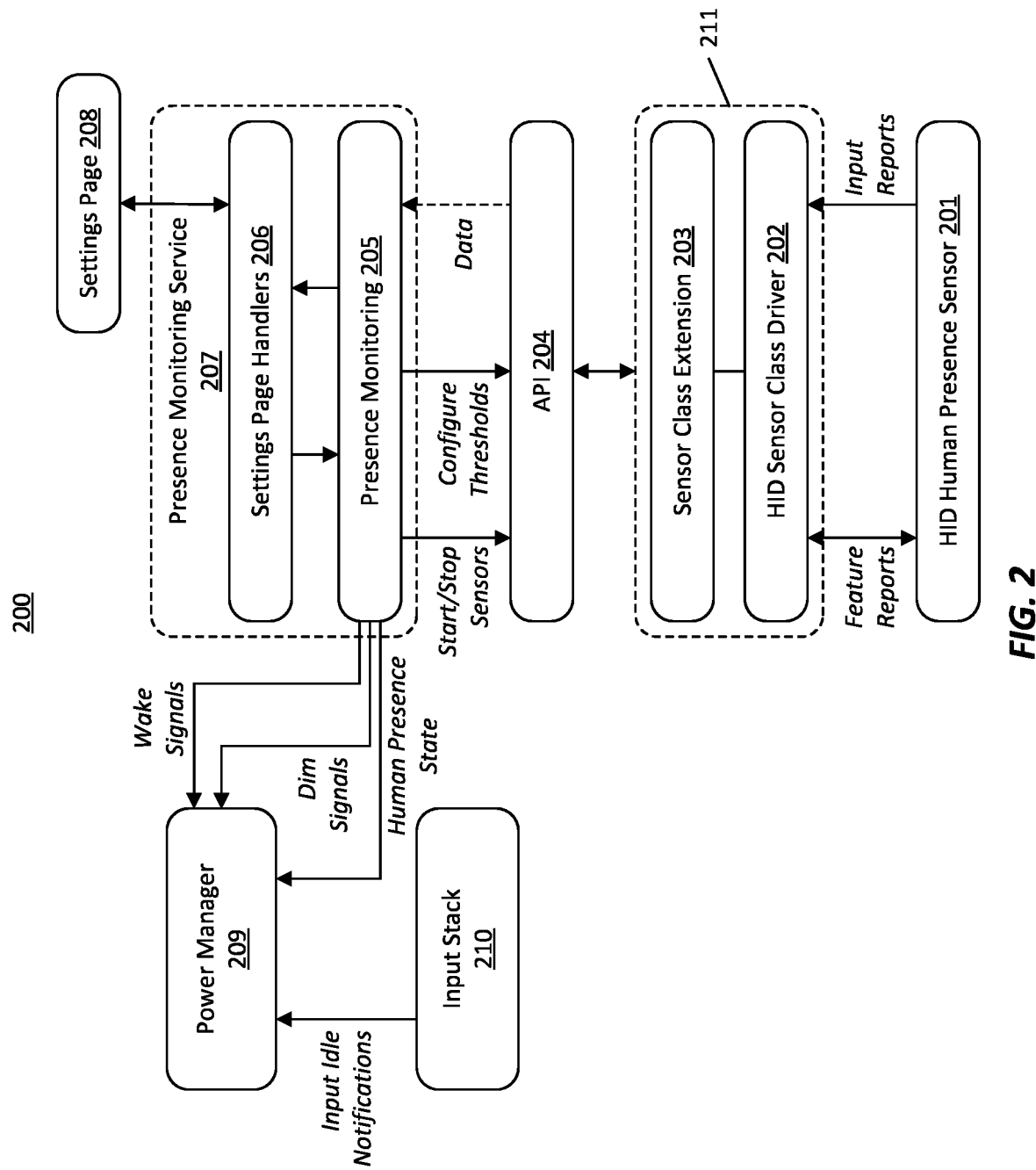
FIG. 2 illustrates an example of native OS support for presence sensors.

In one example, and in the context of sensor 105 being a presence sensor, sensor service 113 is a presence monitoring service that uses sensor 105 to monitor a human presence state, and sensor action component 112 is a power manager that affects a power state of computer system 101 based on signals from the presence monitoring service. In this context, FIG. 2 illustrates example 200, which details one example of native OS support for presence sensors. In example 200, an HID human presence sensor 201 (e.g., sensor 105) is a hardware device that detects human presence. In some embodiments, HID human presence sensor 201 is supplied by an IHV or OEM of computer system 101. In other embodiments, HID human presence sensor 201 is supplied by a user of computer system 101. As shown in example 200, HID human presence sensor 201 communicates data (e.g., feature reports, input reports) with a presence sensor driver 211 (e.g., sensor driver 111). In example 200, presence sensor driver 211 is shown as including an HID sensor class driver 202 and a sensor class extension 203. In embodiments, sensor class extension 203 is an extension to HID sensor class driver 202 that provides HID class driver support for HID-based presence sensors.

Continuing with example 200, presence sensor driver 211 and a presence monitoring service 207 (e.g., sensor service 113) communicate with each other via an API 204. As shown, this communication can include presence sensor driver 211 sending sensor payloads (e.g., human presence reports) to presence monitoring service 207 and presence monitoring service 207 configuring presence sensor driver 211 and/or HID human presence sensor 201 (e.g., start/stop sensor controls, thresholds). Presence monitoring service 207 includes a presence monitoring component 205 to monitor data (e.g., presence signals and reports) received from presence sensor driver 211, and settings page handlers 206 to facilitate operating a user-facing settings page 208 that allows a user to configure presence sensing features.

As shown in example 200, presence monitoring service 207 sends signals to a power manager 209 (e.g., sensor action component 112), such as a human presence state, a wake signal (e.g., to wake computer system 101), and a dim signal (e.g., to dim a display). Together with idle notifications from an input stack 210, power manager 209 controls computer system 101 state based on human presence. For example, power manager 209 uses human presence to implement "wake on approach," "lock on leave," and "adaptive dimming" features.

In accordance with the embodiments described herein, OS 110 includes a sensor plug-in mechanism, which enables action (e.g., by a third party) on sensor payloads via a broker process. Some embodiments of this sensor plug-in mechanism enable custom payload data to be added to sensor payloads and enable third-party action on this custom payload data. These embodiments provide a new way for presence sensors and other sensor types to intervene in an OS's actions and decisions based on custom sensor data and custom actions on that data. In one example, sensor 105 is a presence sensor, and a third-party extension, which can modify a present/not present payload consumed by OS 110 based on a custom payload (e.g., added by sensor 105 or sensor driver 111) that identifies (or is used to identify) whether a detected user is authorized to access computer system 101.

To accomplish the foregoing, embodiments introduce the capability to create a broker process that hosts a plug-in, such as a plug-in provided by a third party (e.g., different from a source of OS 110). For example, in FIG. 1, OS 110 is illustrated as comprising a broker component 114, and storage medium 104 is illustrated as storing computer-executable instructions implementing an application 115 (e.g., an application that executes within the context of OS 110). In some embodiments, application 115 is provided by a source of a source of OS 110. In other embodiments, application 115 is provided by a third party. In embodiments, broker component 114 instantiates a broker process that sandboxes a plug-in 115a that is provided by application 115 from sensor service 113 (e.g., via process isolation). This sandboxing enables the secure use of third-party plug-ins by protecting sensor service 113 (and OS 110 generally) from malicious or poorly-written third-party plug-in code. In embodiments, this broker process is a user-mode process. In one example, plug-in 115a uses a Component Object Model (COM) API. In another example, plug-in 115a uses a Remote Procedure Call (RPC) API.

Figure 3:
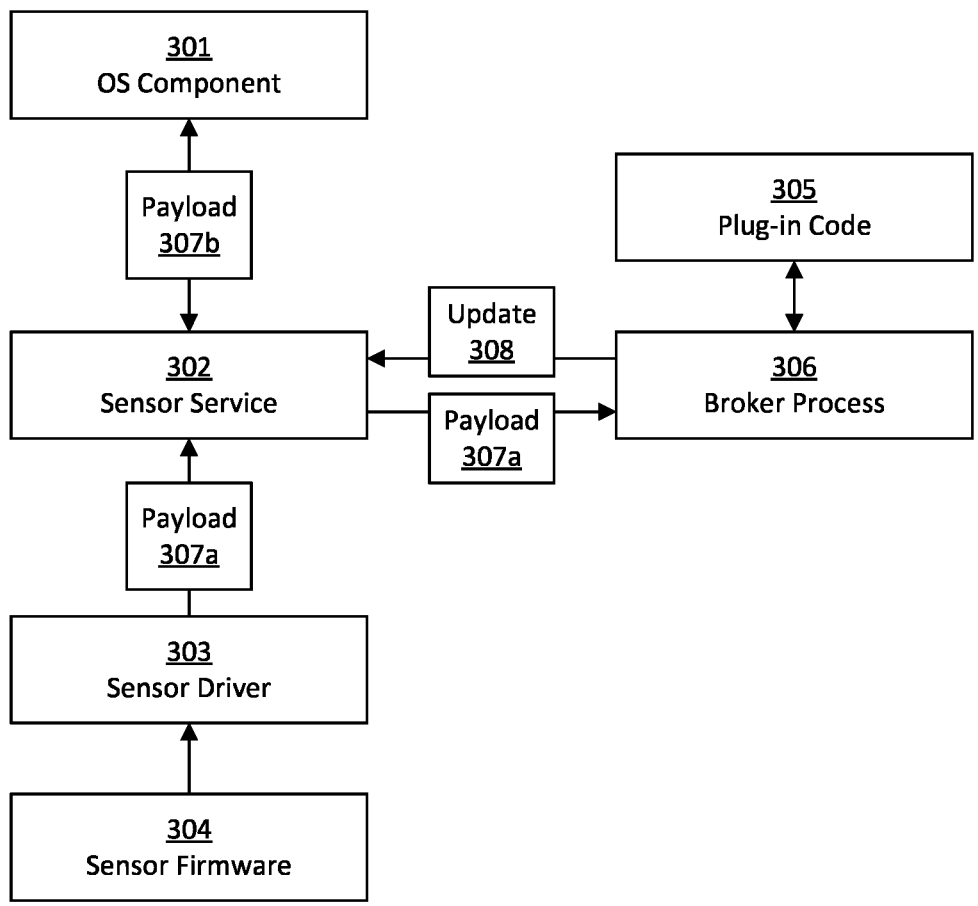
FIG. 3 illustrates an example of a sensor plug-in mechanism that securely enables action on sensor payloads via a broker process.

FIG. 3 illustrates example 300 of a sensor plug-in mechanism that securely enables action (e.g., by a third party) on sensor payloads via a broker process. In example 300, sensor firmware 304 sends data (e.g., raw data signals, processed data signals) to sensor driver 303 (e.g., sensor driver 111). Using this data, sensor driver 303 creates a sensor payload (payload 307a) and sends payload 307a to sensor service 302 (e.g., sensor service 113). As shown, sensor service 302 sends payload 307a to broker process 306 (e.g., created by broker component 114). Broker process 306 hosts plug-in code 305 (e.g., plug-in 115a), which analyzes payload 307a and sends an update 308 back to sensor service 302. Sensor service 302 then incorporates this update 308 into payload 307a, resulting in a modified payload 307b. Sensor service 302 then sends this modified payload 307b (or a signal generated therefrom) to an OS component 301 (e.g., sensor action component 112).

In some embodiments, plug-in code 305 acts on standard data fields within payload 307a to create updates to those data fields. For example, payload 307a comprises luminance data from a photodiode, and plug-in code 305 adjusts that luminance data based on calibration data. In other embodiments, plug-in code 305 acts on custom payload data within payload 307a to create updates to standard data fields. For example, payload 307a comprises custom payload data added by sensor driver 303, and plug-in code 305 adjusts standard data fields based on the contents of that custom payload data. To illustrate, payload 307a comprises an indication of a human presence state (e.g., present), and plug-in code 305 uses a custom payload (e.g., a photo of a person detected) to provide an update to the human presence state (e.g., not present, because the person in the photo is not an authorized user).

Figure 4:
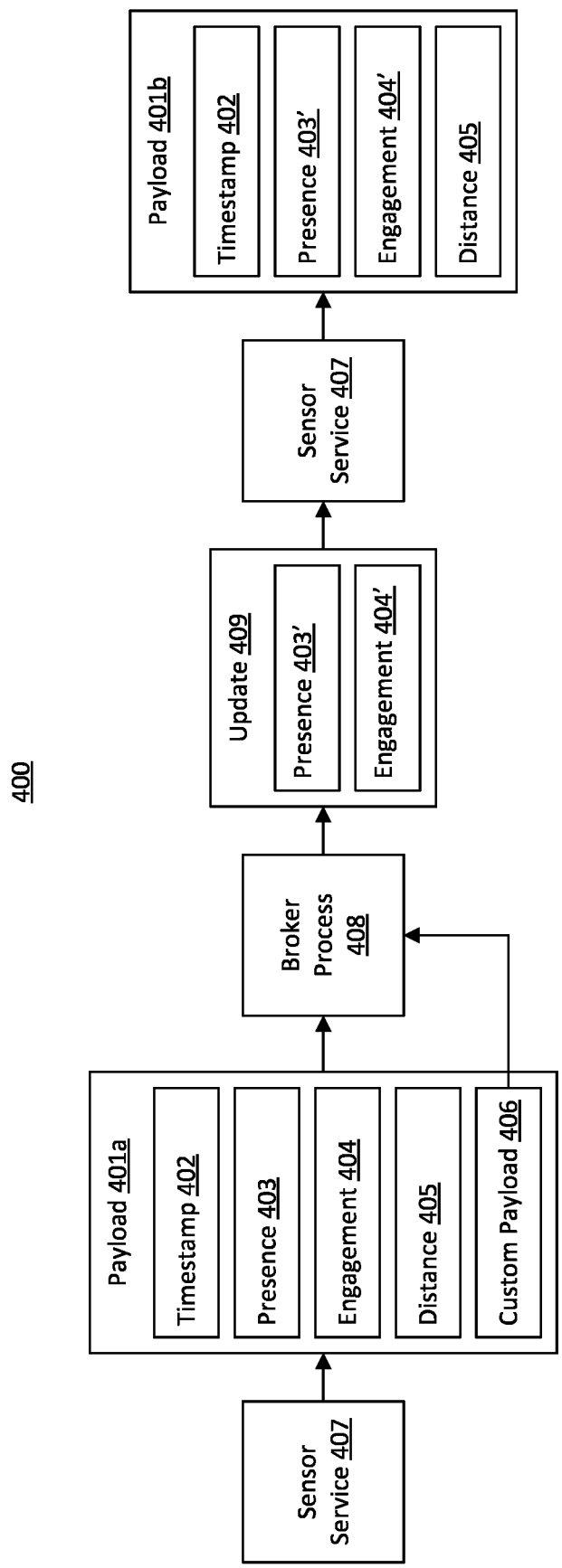
FIG. 4 illustrates an example of updating a sensor payload via a broker process.

FIG. 4 illustrates example 400 of updating a sensor payload via a broker process. In example 400, a sensor service 407 (e.g., sensor service 113, sensor service 302) sends a payload 401a to a broker process 408 (e.g., a process created by broker component 114, broker process 306). In example 400, payload 401a is a human presence report comprising standard human presence fields, including a timestamp 402, a presence state 403 (e.g., present), an engagement state 404 (e.g., engaged), and a distance 405. Payload 401a also includes a custom payload 406 (e.g., a photo). As shown in example 400, broker process 408 analyzes custom payload 406 to generate an update 409 and sends that update 409 back to sensor service 407. For example, update 409 includes an updated presence state 403' (e.g., not present) and an updated engagement state 404' (e.g., not engaged). Sensor service 407 then incorporates update 409 into a modified payload 401b.

Figure 5:
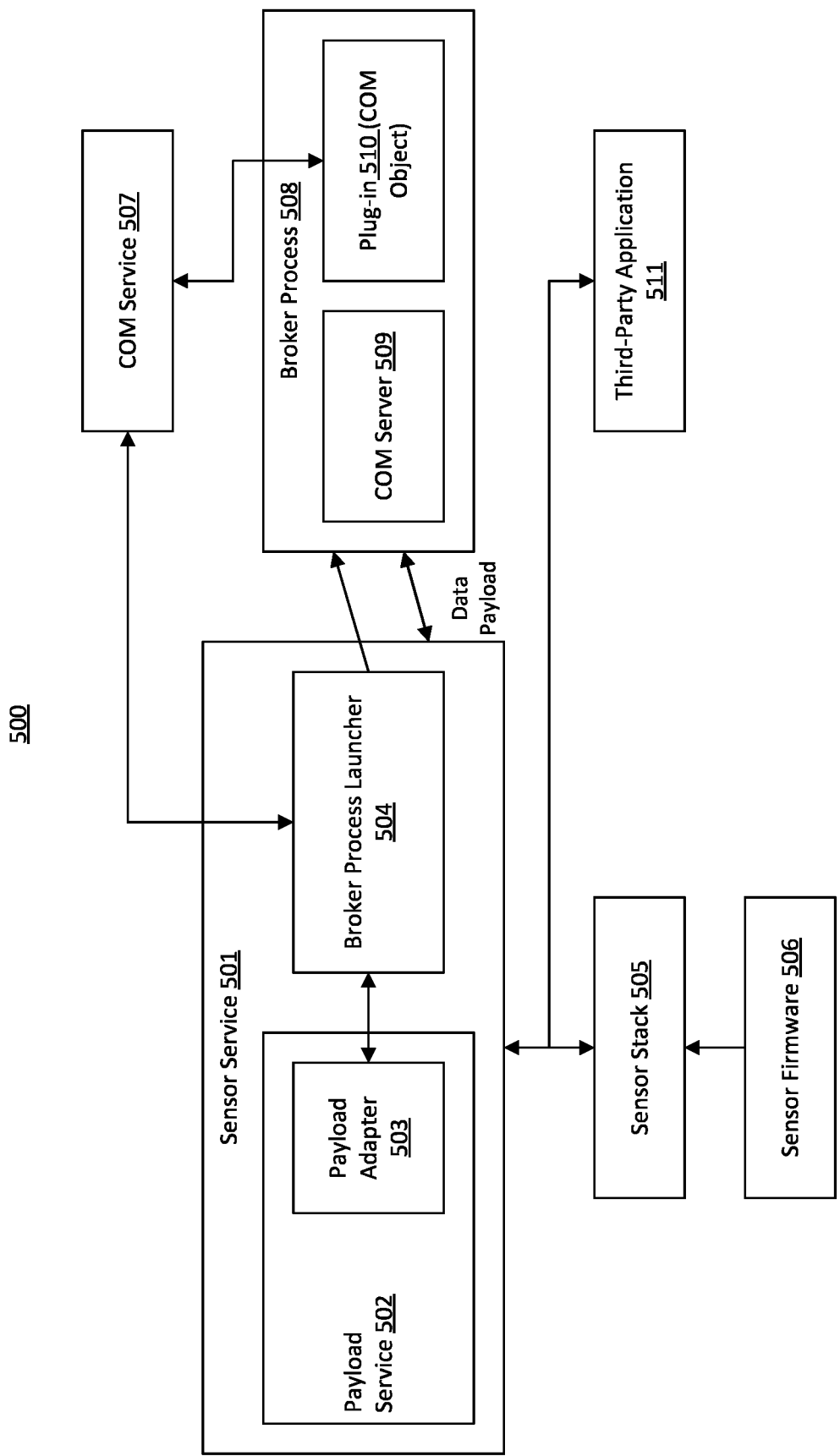

As mentioned, in some embodiments, plug-in 115a uses a COM API. FIG. 5 illustrates example 500 of a COM plug-in architecture that facilitates secure communications between a sensor service and a plug-in. In example 500, a sensor firmware 506 sends raw or processed sensor data to a sensor stack 505 (e.g., sensor driver 111, sensor driver 303), which communicates payload data to a sensor service 501 (e.g., sensor service 113, sensor service 302). As shown, in embodiments, sensor stack 505 may also communicate the sensor payload data to a third-party application 511 (e.g., application 115), which may use the sensor payload data to perform some application-level action.

In example 500, sensor service 501 includes a payload service 502, which in turn includes a payload adapter 503. In embodiments, payload service 502 processes sensor payloads received from sensor stack 505. In embodiments, based on the processing of a sensor payload by payload service 502, payload adapter 503 determines whether a given sensor payload should be processed by a plug-in (e.g., a third-party plug-in provided by third-party application 511). In embodiments, payload adapter 503 determines whether a given sensor payload should be processed by a plug-in based on a type of the sensor payload or based on the presence of custom payload data within the sensor payload (e.g., added by sensor stack 505). In embodiments, when payload adapter 503 determines that a given sensor payload should be processed by a plug-in, payload adapter 503 passes that sensor payload to broker process 508 and then incorporates any payload updates received from broker process 508 into the sensor payload.

In example 500, sensor service 501 includes a broker process launcher 504, which launches the broker process 508 via a COM service 507 (e.g., in response to payload adapter 503 determining that a sensor payload is to be processed by broker process 508 or during initialization of sensor service 501). The broker process 508, in turn, is illustrated as including a COM server 509 and a plug-in 510 in the form of a COM object. In embodiments, plug-in 510 is provided by third-party application 511. In embodiments, the hosting of plug-in 510 within broker process 508 provides process isolation (e.g., isolating plug-in 510 from a process corresponding to sensor service 501). This process isolation avoids the potential crashing of sensor service 501 in case of bugs in plug-in code and avoids attacks against sensor service 501 or an OS by malicious plug-in code. In embodiments, this approach provides flexibility to control broker process instantiation, out-of-process server registration, and extensibility (e.g., to alter the communication model). In embodiments, activating plug-in 510 as a COM object provides the benefit of increased simplicity for developers and the ability to handle registrations of driver packages.

Embodiments are now described in connection with FIG. 6, which illustrates a flow chart of an example method 600 for incorporating an update from a plug-in into a sensor payload. In embodiments, instructions for implementing method 600 are encoded as computer-executable instructions (e.g., sensor service 113, broker component 114) stored on a computer storage medium (e.g., storage medium 104) that are executable by a processor (e.g., processor system 102) to cause a computer system (e.g., computer system 101) to perform method 600.

The following discussion now refers to a method and method acts. Although the method acts are discussed in specific orders or are illustrated in a flow chart as occurring in a particular order, no order is required unless expressly stated or required because an act is dependent on another act being completed prior to the act being performed.

Figure 6:
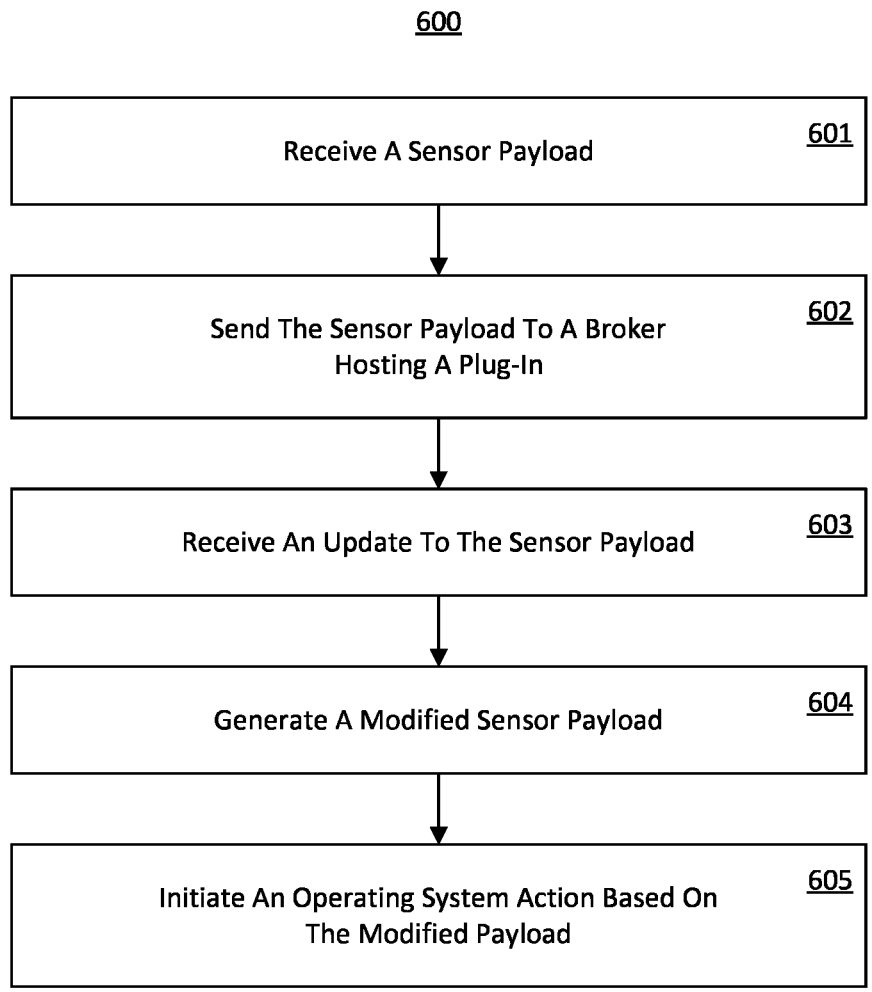
FIG. 6 illustrates a flow chart of an example of a method for incorporating an update from a plug-in into a sensor payload.

Referring to FIG. 6, in embodiments, method 600 comprises act 601 of receiving a sensor payload. In some embodiments, act 601 comprises receiving a sensor payload at a sensor service, the sensor payload including a data field that comprises a first value that corresponds to a reading by a sensor device. For example, sensor service 407 (e.g., sensor service 113) receives payload 401*a* corresponding to sensor 105.

In some embodiments, sensor service 407 receives payload 401*a* from sensor driver 111. Thus, in some embodiments of act 601, the sensor payload is received from a sensor driver. In some embodiments, sensor 105 is a human presence sensor, and payload 401*a* is a human presence report. Thus, in some embodiments of act 601, the sensor device comprises a human presence sensor, and the sensor payload is a human presence report.

As demonstrated in connection with FIG. 4, in some embodiments, a sensor payload comprises custom payload data, such as custom payload 406. Thus, in some embodiments of act 601, the sensor payload includes custom payload data. In embodiments, this custom payload data is defined by a third party associated with the plug-in logic (e.g., a provider of application 115, which is different from a provider of OS 110).

Method 600 also comprises act 602 of sending the sensor payload to a broker hosting a plug-in. In some embodiments, act 602 comprises sending the sensor payload to a broker process that is separate from the sensor service and that hosts plug-in logic. For example, sensor service 407 sends payload 401*a* to broker process 408 (e.g., a process created by broker component 114, which hosts plug-in 115*a*).

Some embodiments include the initiation of the broker processes, an example of which was described in connection with FIG. 4. Thus, in some embodiments, method 600 comprises initiating the broker process based on receiving the sensor payload at the sensor service. In embodiments, application 115 registers the availability of plug-in 115*a*, such as via a COM API. Thus, in some embodiments, initiating the broker process comprises identifying a registration of an application that provides the plug-in logic. Some embodiments determine which application is associated with a sensor payload based on the type of the sensor payload. Thus, in some embodiments, method 600 comprises identifying the application based on a sensor payload type. As was demonstrated in connection with FIG. 5, in some embodiments, initiating the broker process comprises initiating a COM server that hosts plug-in logic.

Method 600 also comprises act 603 of receiving an update to the sensor payload. In some embodiments, act 603 comprises receiving a sensor payload update from the broker process, the sensor payload update including a second value for the data field that is different from the first value, the second value having been determined by the plug-in logic. For example, sensor service 407 receives update 409 from broker process 408. As demonstrated by an arrow between custom payload 406 and update 409 in FIG. 4, in embodiments in which the sensor payload includes custom payload data, the plug-in logic determines the second value based on the custom payload data.

Method 600 also comprises act 604 of generating a modified sensor payload. In some embodiments, act 604 comprises creating a modified sensor payload from the sensor payload, including updating the data field to comprise the second value. For example, sensor service 407 incorporates update 409 into payload 401*a* to obtain modified payload 401*b*, which includes updated presence state 403' and updated engagement state 404'.

Method 600 also comprises act 605 of initiating an OS action based on the modified payload. For example, sensor service 407 (sensor service 113) sends the modified sensor payload to sensor action component 112 or otherwise signals sensor action component 112 to perform an action based on the modified sensor payload. In embodiments, the OS action that is initiated based on the modified sensor payload is different from an OS action that would have been initiated based on the original sensor payload. In some embodiments, initiating the OS action in act 605 comprises performing that OS action. In other embodiments, initiating the OS action in act 605 comprises providing or transmitting an instruction for the OS to perform the action.

Embodiments of the disclosure may comprise or utilize a special-purpose or general-purpose computer system (e.g., computer system 101) that includes computer hardware, such as, for example, a processor system (e.g., processor system 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 104). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media can include a network and/or data links that carry program code in the form of computer-executable instructions or data structures that are accessible by a general-purpose or special-purpose computer system. A "network" is defined as one or more data links that enable the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106) and eventually transferred to computer system RAM and/or less volatile computer storage media at a computer system. Thus, computer storage media can be included in computer system components that also (or even primarily) utilize transmission media.

Computer-executable instructions comprise, for example, instructions and data which, when executed at a processor system, causes a general-purpose computer system, a special-purpose computer system, or a special-purpose processing device to perform a function or group of functions. Computer-executable instructions may be, for example, binaries, intermediate format instructions (e.g., assembly language), or source code.

The disclosed systems and methods may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosed systems and methods may also be practiced in distributed system environments (e.g., where hardwired and/or wireless data links connect local and remote computer systems) both perform tasks. As such, in a distributed system environment, a computer system may include a plurality of constituent computer systems. Program modules may be located in local and remote memory storage devices in a distributed system environment.

The embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (Saas), Platform as a Service (PaaS), and Infrastructure as a Service (IaaS). The cloud computing model may also be deployed using different deployment models such as private cloud, community cloud, public cloud, hybrid cloud, etc.

Some embodiments, such as a cloud computing environment, may comprise a system with one or more hosts capable of running one or more virtual machines. During operation, virtual machines emulate an operational computing system, supporting an OS and perhaps one or more other applications. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics.

The described embodiments are only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented at a computer system that includes a processor system comprising:
   receiving, at a sensor service of an operating system (OS), a sensor payload that includes a data field that is defined by the OS, and that comprises a first value that corresponds to a reading by a sensor device;
   sending, by the sensor service, the sensor payload to a broker process that is separate from the sensor service, wherein the broker process,
      hosts plug-in logic that is provided by an application executing at the OS, and
      sandboxes an execution of the plug-in logic within the broker process;
   receiving, by the sensor service, a sensor payload update from the broker process, the sensor payload update including a second value for the data field that is different from the first value, the second value having been determined by the execution of the plug-in logic within the broker process;
   creating, by the sensor service, a modified sensor payload from the sensor payload, including updating the data field to comprise the second value; and
   initiating a second OS action based on the second value of the data field, the second OS action being different from a first OS action that would result from the first value of the data field.

2. The method of claim 1, wherein the sensor payload is received from a sensor driver.

3. The method of claim 1, wherein the sensor device comprises a human presence sensor.

4. The method of claim 1, wherein the sensor payload is a human presence report.

5. The method of claim 1, wherein,
   the sensor payload includes custom payload data that is defined by the application; and
   the plug-in logic determines the second value based on the custom payload data.

6. The method of claim 5, wherein the custom payload data is defined by a third party associated with the plug-in logic.

7. The method of claim 1, wherein the method further comprises initiating the broker process based on receiving the sensor payload at the sensor service.

8. The method of claim 7, wherein initiating the broker process comprises identifying a registration of the application.

9. The method of claim 8, wherein the method further comprises identifying the application based on type information associated with the sensor payload.

10. The method of claim 7, wherein initiating the broker process comprises initiating a Component Object Model (COM) server that hosts the plug-in logic.

11. A computer system comprising:
   a processor system; and
   a computer storage media that stores computer-executable instructions that are executable by the processor system to at least:
      receive, at a sensor service of an operating system (OS), a sensor payload that includes:
         a data field that is defined by the OS, and that comprises a first value that is based on a reading by a sensor device; and
         custom payload data that is defined by an application executing at the OS;
      send, by the sensor service, the sensor payload to a broker process that is separate from the sensor service, wherein the broker process,
         hosts plug-in logic that is provided by the application, and
         sandboxes an execution of the plug-in logic within the broker process;
      receive, by the sensor service, a sensor payload update from the broker process, the sensor payload update including a second value for the data field that is different from the first value, the second value having been determined by the execution of the plug-in logic within the broker process and based on the custom payload data;
      create, by the sensor service, a modified sensor payload from the sensor payload, including updating the data field to comprise the second value; and
      transmit an instruction to perform a second OS action based on the second value of the data field, the second OS action being different from a first OS action that would result from the first value of the data field.

12. The computer system of claim 11, wherein the sensor payload is received from a sensor driver.

13. The computer system of claim 11, wherein the sensor device comprises a human presence sensor.

14. The computer system of claim 11, wherein the sensor payload is a human presence report.

15. The computer system of claim 11, wherein the custom payload data is defined by a third party associated with the plug-in logic.

16. The computer system of claim 11, wherein the computer-executable instructions are also executable by the processor system to initiate the broker process based on receiving the sensor payload at the sensor service.

17. The computer system of claim 16, wherein initiating the broker process comprises identifying a registration of the application.

18. The computer system of claim 17, wherein the computer-executable instructions are also executable by the processor system to identify the application based on a type of the sensor payload.

19. The computer system of claim 16, wherein initiating the broker process comprises initiating a Component Object Model (COM) server that hosts the plug-in logic.

20. A computer storage medium that stores computer-executable instructions that are executable by a processor system to at least:

receive, at a sensor service of an operating system (OS), a sensor payload that includes a human presence report comprising a data field that is defined by the OS, and that comprises a first value that corresponds to a reading by a human presence sensor device;

send, by the sensor service, the sensor payload to a broker process that is separate from the sensor service, wherein the broker process,
  hosts plug-in logic that is provided by an application executing at the OS, and
  sandboxes an execution of the plug-in logic within the broker process;

receive, by the sensor service, a sensor payload update from the broker process, the sensor payload update including a second value for the data field that is different from the first value, the second value having been determined by the execution of the plug-in logic within the broker process;

create, by the sensor service, a modified sensor payload from the sensor payload, including updating the data field to comprise the second value; and initiate a second OS action based on the second value of the data field, the second OS action being different from a first OS action that would result from the first value of the data field.

\* \* \* \* \*